Figure 1:
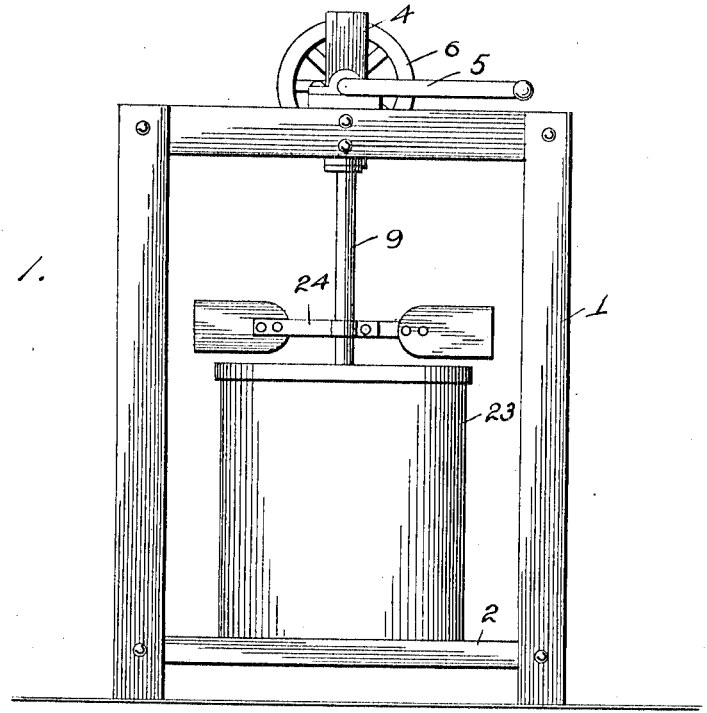

W. F. BROWN.
CHURN.
APPLICATION FILED MAY 20, 1913.

1,106,188.

Patented Aug. 4, 1914.
2 SHEETS—SHEET 1.

WITNESSES:

INVENTOR:
W. F. Brown
By
Attorney

THE NORRIS PETERS CO., PHOTO-LITHO., WASHINGTON, D. C.

W. F. BROWN.
CHURN.
APPLICATION FILED MAY 20, 1913.
1,106,188.
Patented Aug. 4, 1914.
2 SHEETS—SHEET 2.
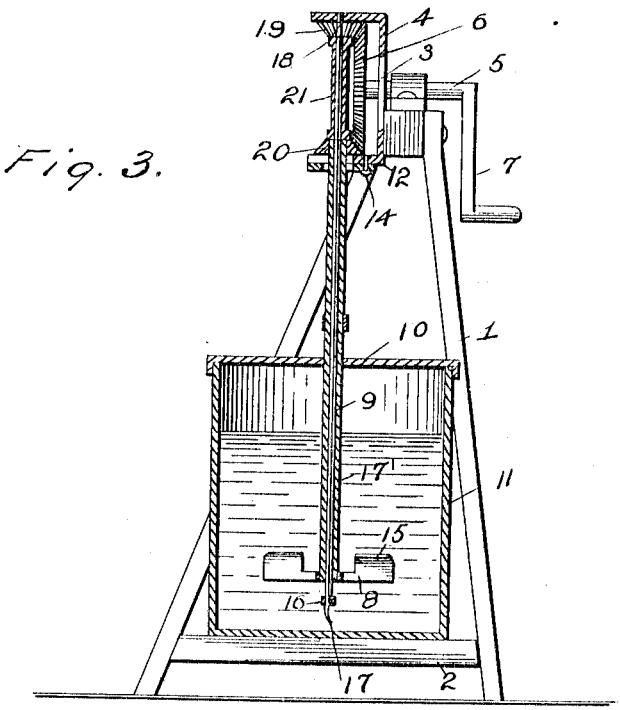
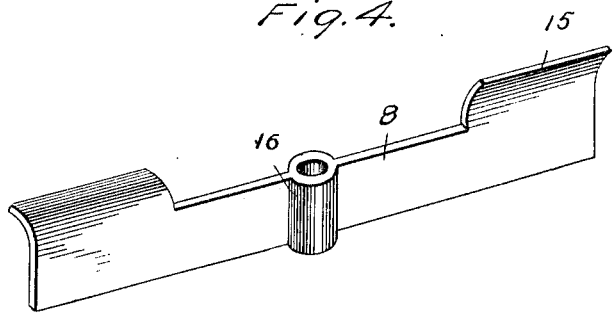
WITNESSES:
INVENTOR:
W. F. Brown,
Attorney

UNITED STATES PATENT OFFICE.

WILLIAM F. BROWN, OF CEDARVILLE, ARKANSAS.

CHURN.

1,106,188.  Specification of Letters Patent.  Patented Aug. 4, 1914.

Application filed May 20, 1913. Serial No. 768,727.

*To all whom it may concern:*

Be it known that I, WILLIAM F. BROWN, a citizen of the United States, residing at Cedarville, in the county of Crawford and State of Arkansas, have invented certain new and useful Improvements in Churns, of which the following is a specification.

This invention relates to new and useful improvements in churn and ice cream freezers and consists in the novel features of construction and arrangement of parts illustrated in the drawings and more particularly pointed out in the appended claim.

Figure 2:
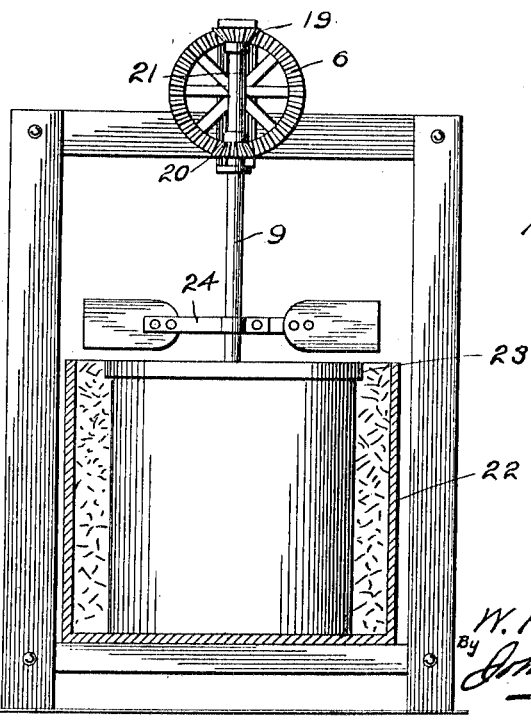

In the accompanying drawings:—Figure 1 is a front elevation of my invention. Fig. 2 is a similar view looking from the opposite end of the device. Fig. 3 is a vertical transverse section of Fig. 1. Fig. 4 is a detail perspective view of the agitators shown on an enlarged scale and Fig. 5 is a detail view of the clamp for holding the upper end of the hollow agitator shaft in position.

Referring to the drawings for a more particular description of the invention and which drawings are for illustrative purposes only and are therefore not drawn to scale, 1 indicates the supporting frame or stand provided with the horizontal platform or base 2 for supporting the churn or ice-cream freezer, as the case may be.

The device further comprises a bracket 3 which is arranged in a vertical position and is secured to the top of the supporting frame in any suitable way. The vertical body portion 4 of the bracket is provided with a suitable opening to receive the inner end of the horizontal power shaft 5 provided at its inner end with the beveled gear wheel 6 and at its outed end with the crank handle 7.

The device comprises the agitator 8 which is suitably attached to the lower end of the hollow upright agitator shaft 9, passing through the top 10 of the churn 11 with its upper end extending through a corresponding horizontal transverse slot formed in the lower horizontal arm 12 of the bracket 3. An arc-shaped clamp 13 is pivoted at one end, as at 14, to the arm 12 of the bracket 3 and when swung into the position indicated by Figs. 3 and 5 holds the upper end of the agitator shaft 9 in position. The agitator 9 is provided at opposite ends with the concave wings 15 which are curved in opposite directions. Owing to this construction, I provide what I may term a centripetal motion which throws the milk toward the center and thereby increases the churning power.

The device also comprises a second agitator 16 provided with the oppositely bent or curved wings 17 which is secured to the lower end of the solid shaft 17' at a point beneath the agitator 8. The shaft 17' extends through and beyond the upper end of the hollow agitator shaft 9 and has a bearing in the upper horizontal arm 18 of the bracket 3.

A beveled pinion 19 is keyed or otherwise secured to the upper end of the agitator shaft 17 and a second beveled pinion 20 to the upper end of the hollow agitator shaft 9 with a hollow sleeve 21 inclosing the upper projecting end of the solid shaft 17 between the pinions 19 and 20. The beveled pinions 19 and 20 are arranged to mesh with the teeth of the gear wheel 6.

In Figs. 1 and 3, I have shown the device arranged for churning milk, but when used for freezing milk for ice-cream, an outer vessel 22 is provided for the reception of the ice which fills the space 23 between the outer and inner vessels.

In operation, the crank handle 7 of the power shaft 5 is turned, which, through the medium of the gear wheel 6 and beveled pinions 19 and 20 keyed to the agitator shafts 17' and 9, respectively, causes said shafts with the agitators 8 and 16 to turn or rotate in opposite directions which gives the maximum churning power with the minimum work applied, and enables the operator to churn the milk in a much quicker time than through the use of churns now on the market.

It will be observed that the wings 17 of the agitator 16 are arranged at an angle with the wings 15 of the agitator 8.

A fan 24 is secured to the agitator shaft 9 for the purpose of keeping flies or other insects away from the vessel containing the milk.

From experience, I have found that in making ice-cream, the milk may be frozen in about three minutes, while about the same amount of time is required to churn milk into butter.

From the foregoing description taken in connection with the drawings, it is thought that the construction and advantages of this invention will be readily understood without requiring a more extended explanation.

Various changes in the form, proportions and minor details of construction will be resorted to without departing from the principles or sacrificing any of the advantages of this invention as defined in the appended claim.

Having described my invention what I claim as new is:—

A churn of the type described including agitators, each having opposite end blades with upwardly extending oppositely curved upper edges, said blades being positioned at right angles to each other, concentric shafts carrying said agitators and actuating means for shafts.

In testimony whereof I affix my signature in presence of two witnesses.

WILLIAM F. BROWN.

Witnesses:
  E. L. NEAL,
  C. L. MASSEY.

---

Copies of this patent may be obtained for five cents each, by addressing the "Commissioner of Patents, Washington, D. C."